United States Patent [19]

Turner

[11] 3,861,323
[45] Jan. 21, 1975

[54] CONVEYOR SYSTEMS
[75] Inventor: John Turner, Stevenage, England
[73] Assignee: Geo. W. King Limited, Stevenage, Hertfordshire, England
[22] Filed: Jan. 31, 1973
[21] Appl. No.: 328,356

[30] Foreign Application Priority Data
Nov. 30, 1972  Great Britain .................... 55451/72

[52] U.S. Cl. .............................. 104/172 S, 104/250
[51] Int. Cl. ........................B61b 3/00, B65g/17/42
[58] Field of Search...104/96, 172 S, 249, 250, 251

[56] References Cited
UNITED STATES PATENTS

| | | |
|---|---|---|
| 3,314,378 | 4/1967 | Potter et al. ...................... 104/172 S |
| 3,357,369 | 12/1967 | Dehne .............................. 104/172 S |
| 3,434,431 | 3/1969 | Dehne .............................. 104/172 S |
| 3,741,126 | 6/1973 | Ross ................................. 104/172 S |

Primary Examiner—M. Henson Wood, Jr.
Assistant Examiner—Robert Saifer
Attorney, Agent, or Firm—Waters, Roditi, Schwartz & Nissen

[57] ABSTRACT

A load trolley of a power-and-free conveyor system runs in a track and has a body and a driving dog carried by the body and movable between an operative position engageable by pushers of a power chain above the track and an inoperative position. The body also carries a three-arm lever which displaces the driving dog and of which one arm is connected to the dog, another arm extends forwards from the body below the track to engage at an indexing region a ramp on a preceding trolley, and the third arm extends to above the track to engage an auto-stop blade at the indexing region or a cam at a transfer region.

9 Claims, 2 Drawing Figures

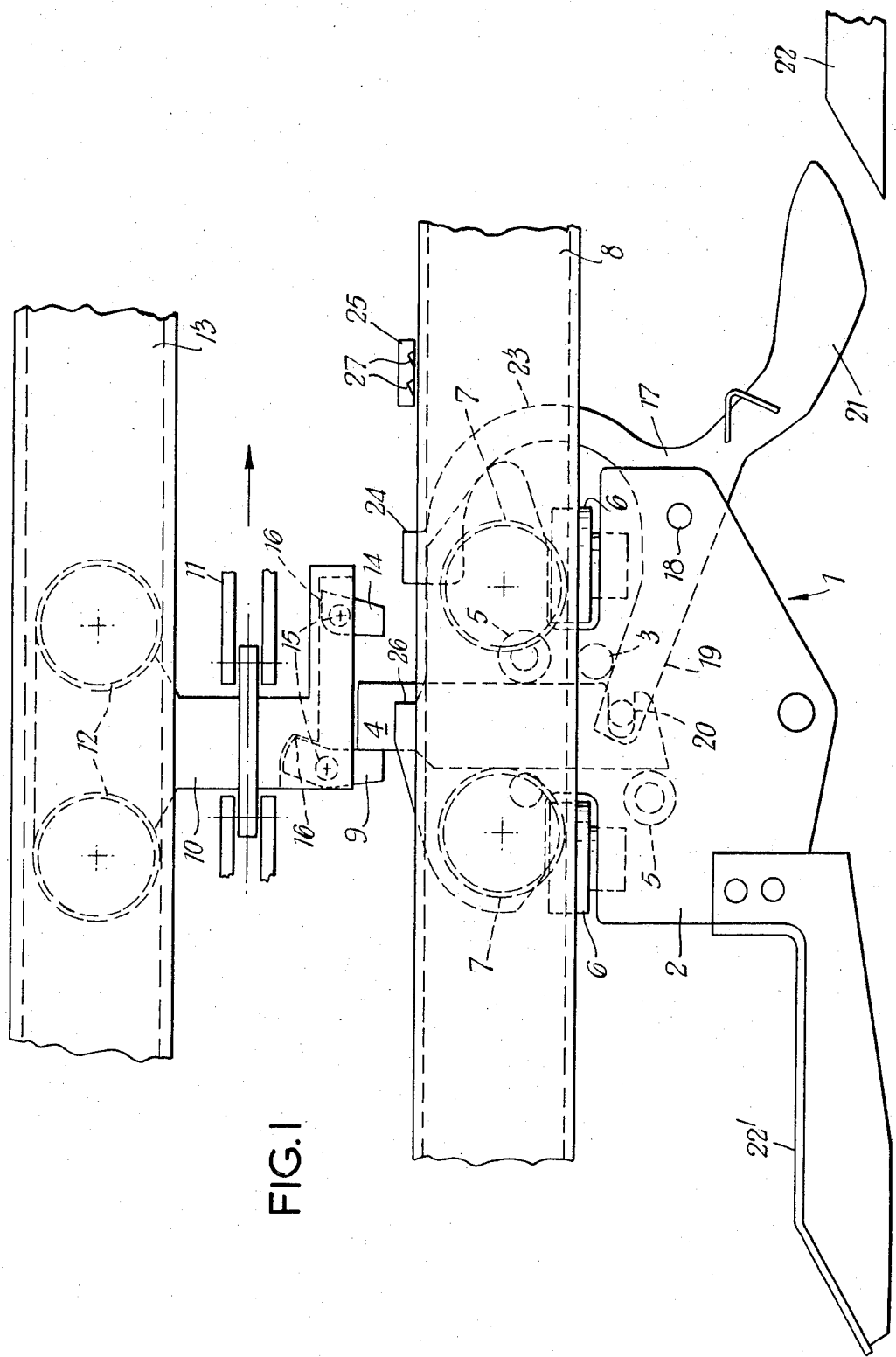

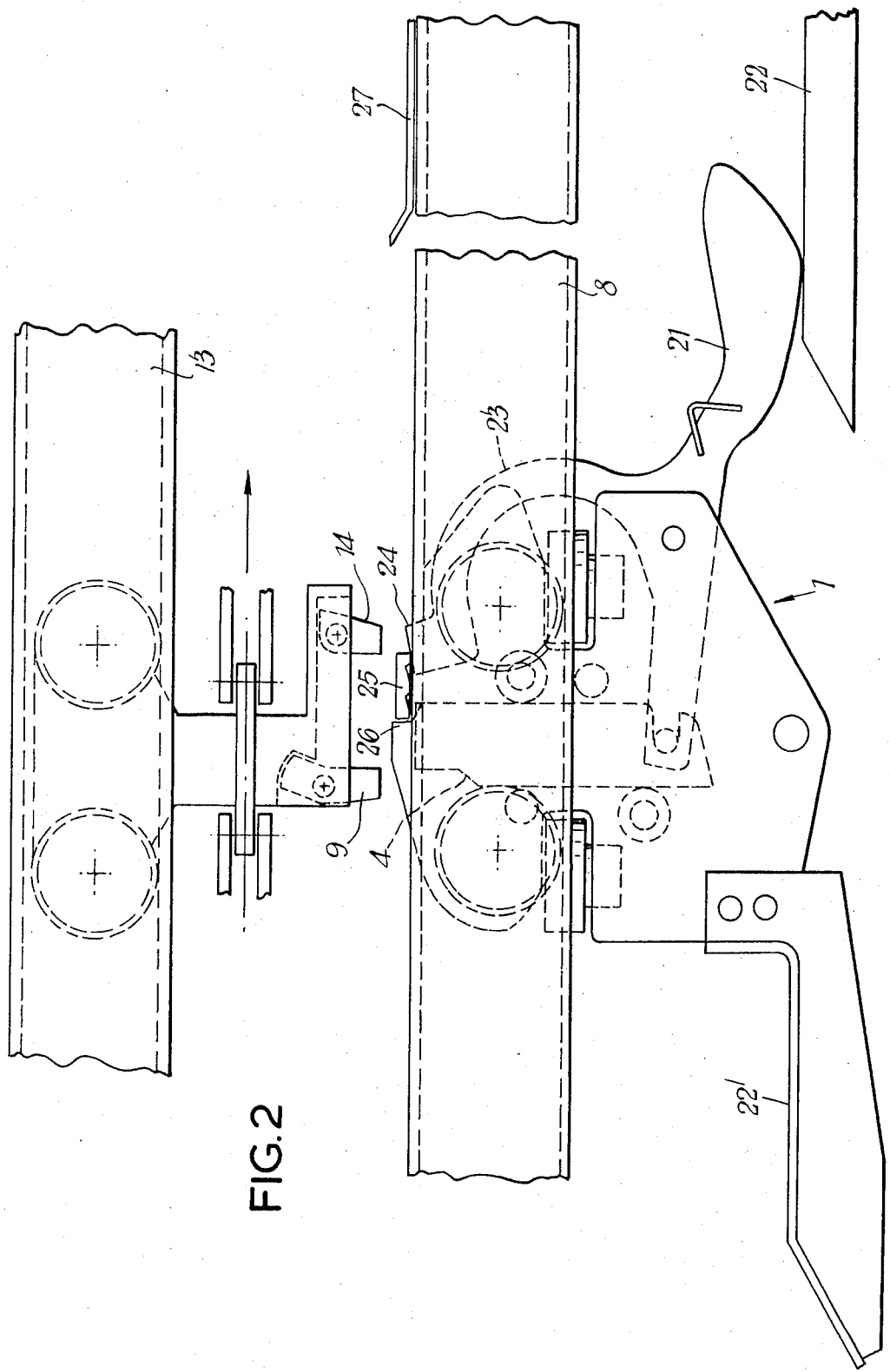

CONVEYOR SYSTEMS

BACKGROUND OF THE INVENTION

1. Field of the Invention

This invention relates to a load trolley for use in a power-and-free conveyor system.

2. Description of the Prior Art

A known power-and-free conveyor system comprises load carriers each consisting of a forward trolley, a rearward trolley and a yoke interconnecting the two trolleys. The carriers travel along a load trolley track above which extends a parallel power track. An endless propelling chain is supported by the power track and has pushers which are engageable with normally operative main driving dogs on the bodies of the forward trolleys to propel the carriers along the load trolley track. Normally operative holdback dogs and the main driving dogs are so mounted on the bodies of the forward trolleys, and normally inoperative auxiliary driving dogs are so mounted on the bodies of the rearward trolleys, as to be displaceable between operative positions in which they are disposed in the path of movement of the pushers and inoperative positions in which they are disposed out of that path.

The system includes at least one indexing region at which the carriers accummulate one behind another and the main driving dogs are disengaged from the pushers. For this purpose an auto-stop attached to the load trolley track in the indexing region projects an auto-stop blade laterally into the path of a first carrier, and this blade depresses the main driving dog of this first carrier to lower the dog into its inoperative position and is then abutted by shoulders on side plates of the body of the forward trolley of the first carrier to stop movement of the carrier along the track. The main driving dog and the holdback dog of each carrier are so interconnected that lowering of the main driving dog into its inoperative position simultaneously lowers the holdback dog into its inoperative position. Projecting rearwards from and fixed to the body of the rearward trolley of each carrier is a proximity ramp, while projecting forwards from and pivotally mounted on the body of the forward trolley of each carrier is a two-arm proximity lever. The forward end of this lever is weighted to tend continuously to lift its rearward end, which is coupled to the driving dog. When the first carrier has been stopped by the auto-stop, the forward end of the proximity lever of the second carrier hits and rides up the ramp of the first carrier to move the main driving dog and thus also the holdback dog of the second carrier into their inoperative positions, and so on for the third and following carriers. When the auto-stop blade is withdrawn and thus frees the main driving dog of the first carrier, the weighted portion of the proximity lever of the first carrier lifts this driving dog into its operative position and the holdback dog returns to its operative position under its own weight. As the first carrier is advanced by a pusher of the power chain, its proximity ramp moves from beneath the proximity lever of the second carrier, so that the main driving dog and the holdback dog of the latter move into their operative positions, and so on for the third and following carriers.

The system also includes at least one transfer region at which the carriers may be transferred from one power chain to another, for example from a fast power chain above a main load trolley track to a slow power chain above that track, or from a power chain above the main track to a power chain above a branch load trolley track. At this region, the auxiliary driving dogs of the carriers are raised into their operative positions. To achieve this, a lateral projection from the upper end of each auxiliary driving dog rides up a cam fixed to the top of the load trolley track in the transfer region. At approximately the same time, the main driving dog and the holdback dog of the carrier in question are brought into their inoperative positions. To achieve this, a lateral projection from the proximity lever of the carrier rides up a cam fixed beneath the load trolley track in the transfer region. Where these two cams terminate, the auxiliary driving dog returns to its inoperative position under its own weight, and the driving dog returns to its operative position under the action of the weighted portion of the proximity lever, so allowing the holdback dog to return to its operative position under its own weight.

The known system has the disadvantage that the carrier, particularly the leading trolley, is somewhat complex. Moreover, if the auto-stop is installed at a rearward incline of the load trolley track, an additional, rearward stop member has to be provided to prevent the carrier running back down the incline under the weight of its load.

SUMMARY OF THE INVENTION

According to the present invention, there is provided a load trolley for use in a power-and-free conveyor system, comprising a body, a driving dog mounted on said body so as to be movable between an operative position in which it is engageable by a pusher of a power chain of said system and an inoperative position in which it is not so engageable, guide means mounted on said body for guiding movement of said trolley along a trolley support of said system, and an operating member movably mounted on said body and including a first part connected to said driving dog to move the dog, a second part disposed at one side of said guide means and displaceable, by contact with a first element stationary relative to said support, to move said operating member to move the driving dog, and a third part disposed at the opposite side of said guide means to said one side and displaceable, by contact with a second element stationary relative to said support, to move said operating member to move the driving dog.

The load trolley of the invention has the advantage of being of relatively simple construction. The trolley need have only two moving parts in addition to any movable guide means thereof.

BRIEF DESCRIPTION OF THE DRAWINGS

In order that the invention may be clearly understood and readily carried into effect, reference will now be made, by way of example, to the accompanying drawings, in which:

FIG. 1 shows a side elevation of part of a conveyor system, with a driving dog in an operative position, and FIG. 2 is a view similar to FIG. 1 but showing the driving dog in an inoperative position.

DESCRIPTION OF THE PREFERRED EMBODIMENT

Referring to the drawings, the conveyor system is of the overhead power-and-free type in which load carriers are propelled along a fixed support track by means of chain trolleys which are interconnected with one another by a power chain and which run in a fixed chain track disposed at a constant spacing above the support track for the load carriers. Each load carrier consists either of a single trolley or of two or more longitudinally spaced trolleys interconnected by one or more yokes. Such single trolley is shown and referenced 1 in the drawings. It has a body consisting of two vertical lateral plates 2 readily releasably interconnected by pins and nut-and-bolt connections such as 3. Mounted between the lateral plates 2 is a driving dog 4 of the trolley. This driving dog is mounted to be vertically reciprocable and for that purpose is guided by rollers 5 between the plates 2. Mounted on the plates 2 are guide wheels 6 rotating about vertical axes and guide wheels 7 rotating about horizontal axes. The guide wheels 6 and 7 serve to guide the trolley 1 in its movement along the load trolley support track 8 which consists of two spaced channel members opening directly towards each other. The trolley 1 is advanced along the track 8 by a pusher dog 9 mounted on the chain trolley 10 which is attached to the power chain 11 and carries rollers 12 whereby the chain trolley 10 is guided in its movement along the chain track 13. A holdback dog 14 limits the degree of forward movement of the trolley 1 relative to the chain trolley 10. Each of the dogs 9 and 14 is pivotally mounted on the chain trolley 10 by horizontal pivot pins 15. The dogs 9 and 14 can turn inwards towards each other from the positions shown in the drawings, but are prevented from turning outwards away from each other by engagement between abutment surfaces 16 on the dogs 9 and 14 and the chain trolley 10. Mounted on the front of the trolley 1 is a three-arm lever 17. It is pivotal about a horizontal pivot pin 18 releasably mounted between the plates 2. One arm 19 of the lever 17 extends rearwardly to the lower end of the driving dog 4 and is there releasably connected thereto by a pin-and-slot coupling 20, of which the pin is fixed to the arm 19 and the slot is formed in the dog 4. A second arm 21 of the lever 17 projects forwards from the trolley and is weighted at its forward end. The weighted forward end of the arm 21 is disposed to the lower side of the guide wheels 6 and 7 is arranged to engage a ramp which is indicated diagrammatically at 22 and which projects rearwards from the single trolley 1, or from the rearward trolley of the carrier in a case where the carrier includes more than one trolley. In the case where the carrier is the single trolley 1, the ramp is arranged as shown at 22'. When the arm 21 rides up the ramp 22, the arm 19 of course lowers the dog 4 from its operative position shown in FIG. 1 into its inoperative position shown in FIG. 2, in which it is out of the path of movement of the dogs 9 and 14. This provision for lowering of the dog 4 is utilized at indexing regions, i.e., at regions where the trolley 1 runs into a preceding trolley. The third arm 23 of the lever 17 extends in an upward and rearward curve between the channels of the track 8 and terminates in an upward projection 24. In the operative position of the dog 4, this projection 24 moves on a path in which may lie the active position of a stop blade 25 of a so-called auto-stop which may be constructed as disclosed in our U.S. Pat. No. 3,648,619. The projection 24 is disposed to the upper side of the guide wheels 6 and 7. When the projection 24 strikes an active auto-stop blade 25, the latter presses rearwards the arm 23 and thus lowers the arm 19 to lower the dog 4 into its inoperative position. The trolley 1 continues to move until the blade 25 strikes abutment shoulders 26 formed in the tops of the plates 2. This condition is shown in FIG. 2 from which it can also be seen that the projection 24 is held depressed by the blade 25. When the blade 25 is retracted into its inactive position, it releases the projection 24, so that the dog 4 is returned to its operative position under the action of the weighted arm 21.

The limit of clockwise movement of the arm 19 in the drawings, and thus the limit of vertically upward movement of the driving dog 4 is determined by the pin 3, which acts as a stop for the arm 19 and also acts as a guide pin for the dog 4.

Where the auto-stop is provided on an upward incline, so that there would be a risk of the trolley 1, stopped on the incline, rolling back down the incline, the arrangement described is particularly advantageous in avoiding this risk. This is achieved in that, in the position shown in FIG. 2, any tendency for the trolley 1 to move backwards causes the blade 25 to tend to turn the arm 23 forwards, but the projection 24 needs to move upwards as the arm 23 moves forwards, and such upward movement of the projection 24 is prevented by the blade 25 itself. Accordingly, the trolley 1 is prevented from moving backwards. Where the chain 11 is a slow-moving chain, it may well be that the inertia of the trolley is insufficient for the shoulders 26 to reach the active blade 25. In this case, the undersurface of the blade 25 may be formed with notches 27 to be engaged by the projection 24, again thereby to prevent backward movement of the trolley 1 once it has been stopped by the auto-stop.

The arrangement described has a number of advantages. Firstly, apart from the wheels 6 and 7, there need be only two moving parts mounted on the body of the trolley. Secondly, the use of the auto-stop blade itself to prevent rolling back of the trolley avoids the need to use an additional stop member for this purpose. Another advantage is that the pivot pins 15 may be designed to shear at a certain overload and to be easily replaced. This avoids costly and difficult replacement of load trolleys which have been damaged by overload.

At a transfer region, i.e., at a region of transfer of the carrier from one power chain to a receiving power chain, and when using a rearward trolley carrying a rearward driving dog which is rendered operative only for transfer, it is preferred that the projection 24 should be depressed by a cam plate fixed along the top of the track 8 and indicated at 27 in FIG. 2, thereby to depress the driving dog 4, so as to avoid collision of the driving dog 4 with the pusher dogs of the receiving power chain.

I claim:

1. In a power-and-free conveyor system, a combination comprising a load trolley track, a load trolley mounted in said track for movement therealong, a power chain extending along said track at a spacing therefrom, pusher dogs on said chain, a first element below said track, and a second element above said track, said load trolley comprising a body, a driving dog mounted on said body so as to be movable between an operative position in which it is engageable by one of said pusher dogs and an inoperative position in which it is not so engageable, guide means mounted on the body for guiding movement of the trolley along said track, and an operating member movably mounted on the body and including a first part connected to the driving dog to move the dog, a second part disposed below said track and displaceable, by contact with said first element, to move said operating member to move the driving dog, and a third part separate from said driving dog disposed above and displaceable, by contact with said second element, to move said operating member to move the driving dog.

2. A combination according to claim 1, wherein said operating member has biassing means urging said operating member to displace said driving dog in the sense from said inoperative position to said operative position and is a three-arm lever pivotally mounted on said body, and said first, second and third parts are provided by first, second and third arms of said lever.

3. A combination according to claim 2, wherein said third arm includes a free end zone which extends rearwards and a projection which is said third part and which projects transversely from said free end zone in a direction away from the first and second arms.

4. A combination according to claim 2, wherein said second element is an auto-stop blade displaceable between an active position in which it extends transversely of said track and lies in the path of movement of said third part and an inactive position in which it lies out of said path.

5. A combination according to claim 4, wherein the contacting of said blade by said third part turns said lever against the action of said biassing means, and, when said trolley has been stopped by said blade, said blade maintains said lever turned against said action of said biassing means.

6. A combination according to claim 5, wherein any tendency of said trolley to move rearwards after stopping by said blade is resisted by such movement causing said third part to jam against said blade in its active position.

7. A combination according to claim 4, wherein said blade has a surface which faces towards said track and in which is formed a hole in which, when said blade is in its active position, said third part tends to jam on rearward movement of said trolley after stopping of said trolley by said blade.

8. A combination according to claim 1, and further comprising holdback dogs on said chain spaced longitudinally of said chain from the respective pusher dogs.

9. A load trolley for use in a power-and-free conveyor system, comprising a body, a driving dog mounted on said body so as to be movable between an operative position in which it is engageable by a pusher of a power chain of said system and an inoperative position in which it is not so engageable, guide means mounted on said body for guiding movement of said trolley along a trolley support of said system, and an operating member movably mounted on said body and including a first part connected to said driving dog to move the dog, a second part disposed at one side of said guide means and displaceable, by contact with a first element stationary relative to said support, to move said operating member to move the driving dog, and a third part disposed at the opposite side of said guide means to said one side and displaceable, by contact with a second element stationary relative to said support, to move said operating member to move the driving dog, said operating member having biassing means urging said operating member to displace said driving dog in the sense from said inoperative position to said operative position, said operating member being a three-arm lever pivotally mounted on said body, said first, second and third parts being provided by first, second and third arms of said lever, said third arm including a free end zone which extends rearwards and a projection comprising said third part and projecting transversely from said free end zone in a direction away from the first and second arms.

* * * * *